United States Patent [19]
Gatto et al.

[11] Patent Number: 5,393,966
[45] Date of Patent: Feb. 28, 1995

[54] DEVICE FOR READING THICKNESS CARRIERS BEARING MAGNETIC CODES AND OPTICAL CODES

[75] Inventors: Jean-Marie Gatto; Dominique Bertrand, both of Paris, France

[73] Assignee: Internationale Des Jeux, Boulogne, France

[21] Appl. No.: 117,810

[22] Filed: Sep. 8, 1993

[30] Foreign Application Priority Data

Sep. 8, 1992 [FR] France ................. 92 10709

[51] Int. Cl.6 ............... G06K 19/08; G06K 7/00
[52] U.S. Cl. .................... 235/440; 235/449
[58] Field of Search ............ 235/440, 449, 482

[56] References Cited

U.S. PATENT DOCUMENTS

| | | | |
|---|---|---|---|
| 4,034,211 | 7/1977 | Horst et al. | 235/487 |
| 4,041,279 | 8/1977 | Foote | 235/440 |
| 4,056,712 | 11/1977 | Trenkamp et al. | 235/440 |
| 4,176,259 | 11/1979 | Lee | 235/449 |
| 4,538,191 | 8/1985 | Suzuki et al. | 360/88 |
| 5,004,898 | 4/1991 | Ihsikawa et al. | 235/475 |
| 5,270,523 | 12/1993 | Chang et al. | 235/449 |

FOREIGN PATENT DOCUMENTS

| | | |
|---|---|---|
| 0087997 | 9/1983 | European Pat. Off. . |
| 0278195 | 8/1988 | European Pat. Off. . |
| 0318213 | 5/1989 | European Pat. Off. . |
| 0357827 | 3/1990 | European Pat. Off. . |
| 2366645 | 4/1978 | France . |
| 340183 | 11/1992 | Japan ................. 235/440 |

*Primary Examiner*—John Shepperd
*Attorney, Agent, or Firm*—Sterne, Kessler, Goldstein & Fox

[57] ABSTRACT

Device for reading magnetic codes borne by carriers such as cards of a specified thickness and optical codes printed on carriers of smaller thickness, characterized in that it includes, mounted in opposite walls (2,3) of a common slot with a width slightly greater than the thickness of a magnetic card, a magnetic reading head (5) associated with elastic means (6) for applying the magnetic head (5) against the magnetic tracks of the card, and an optical reading head (10), means (11;14) for limiting, in the absence of a magnetic card, the engagement of the magnetic reading head into the slot (1) over a part of the width of the latter so as to leave between the magnetic head and the wall of the slot opposite the latter, a gap (B) sufficient for the passage of a carrier of optical codes, and means (11) for recognizing the output signals from the magnetic reading head (5) or from the optical reading head (10).

8 Claims, 2 Drawing Sheets

DEVICE FOR READING THICKNESS CARRIERS BEARING MAGNETIC CODES AND OPTICAL CODES

The present invention relates to readers of codes such as bar codes or magnetic codes placed on documents such as cards, tickets or the like.

A magnetic code reader often takes the form of a housing provided with a slot intended to receive magnetic cards, a magnetic reading head being arranged in the slot so as to be brought into contact with the magnetic card at the location of the latter where the magnetic codes are recorded.

An optical reader is generally arranged in proximity to a location at which objects bearing bar codes are presented to it.

Magnetic and optical code readers are distinct devices which are generally used to read different kinds of information.

Thus, a magnetic reader is most usually used for reading credit cards such as bank cards, telecards or the like.

On the other hand, the optical reader is employed more for reading codes designating products sold in department stores or similar shops.

In the field of lottery games, lotto or the like, it may be found necessary simultaneously to read magnetic cards such as credit cards with a view to deducting a stake and to record by means of an optical reader the bar code encoded ticket numeral(s) corresponding, for example, to the stake deducted with the aid of the magnetic card.

The invention aims to create a reader which is capable of reading a magnetic code and an optical code equally well.

Its subject is therefore a device for reading magnetic codes borne by carriers such as cards of a specified thickness and optical codes printed on carriers of smaller thickness, characterized in that it includes, mounted in opposite walls of a common slot with a width slightly greater than the thickness of a magnetic card, a magnetic reading head associated with elastic means for applying the magnetic head against the magnetic tracks of the card, and an optical reading head, means for limiting, in the absence of a magnetic card, the engagement of the magnetic reading head into the slot over a part of the width of the latter so as to leave between the magnetic head and the wall of the slot opposite the latter, a gap sufficient for the passage of a carrier of optical codes, and means for recognizing the output signals from the magnetic reading head or from the optical reading head.

The invention will be better understood with the aid of the description which will follow, given merely by way of example and provided with reference to the attached drawings, in which.

Figure 1:
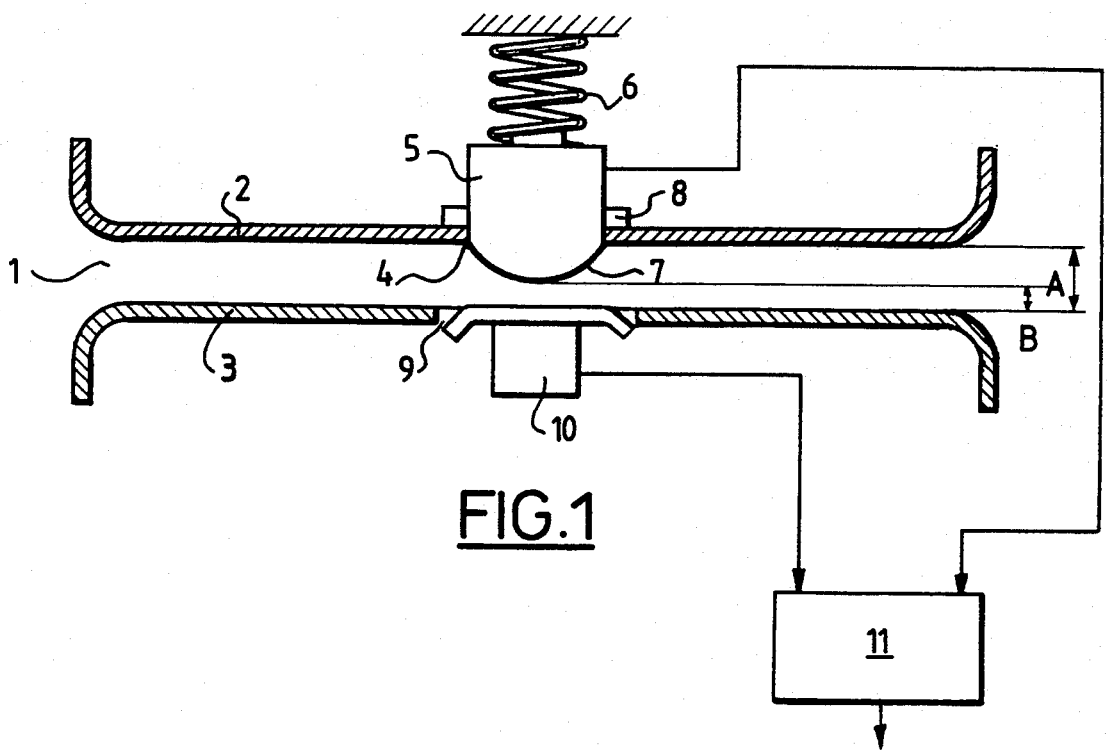
FIG. 1 is a diagrammatic sectional view of a first embodiment of a magneto-optical reader according to the invention.

Represented diagrammatically in section in FIG. 1 is a slot 1 for receiving magnetic code carriers generally produced in the form of cards of thickness A and optical code carriers of smaller thickness sometimes consisting of sheets of paper or the like on which the bar codes are printed.

The slot 1 is delimited by two opposite walls 2 and 3.

In the wall 2 is made an orifice 4 in which is mounted a magnetic reading head 5 pulled towards the inside of the slot by a spring 6 and having an end 7 opposite the spring, of rounded shape allowing clearance of the head on insertion of a card of thickness A (not shown) and application of the latter under the effect of the spring 6 against the magnetic tracks borne by the card.

Engagement of the magnetic head 5 into the slot 1 is limited to a value smaller than the width A of the slot by an abutment 8 cooperating with the wall 2 of the slot.

In the wall 3, of the slot 1 opposite the wall 2, is made another orifice 9 in which is arranged fixedly an optical reading head 10, so as to be flush with the inside edge of the wall 3.

Thus, between the rounded end 7 of the magnetic head and the wall 3 of the slot opposite the wall 2, is made a gap of width B which allows, when the magnetic head is not used, the free passage into the slot of an optical code carrier of small thickness and the reading of the bar codes which it bears by the optical reading head 10.

According to another embodiment, the magnetic head 5 can be mounted on the wall by means of a leaf spring which simultaneously provides for the function for applying the reading head 5 against the magnetic tracks of the card and limiting the engagement of the magnetic head into the slot 1 in the absence of a magnetic card in order to define between the magnetic reading head and the optical reading head 10, flush with the inside edge of the wall 3, a gap of width B for the insertion of an optical code carrier.

The magnetic head 5 and the optical reading head 10 are both linked to a circuit 11 such as a microprocessor forming part of an installation equipped with the magneto-optical head according to the invention and intended to recognize the output signals from one or the other of these heads with a view to allowing appropriate subsequent processing of the signals.

Figure 2:
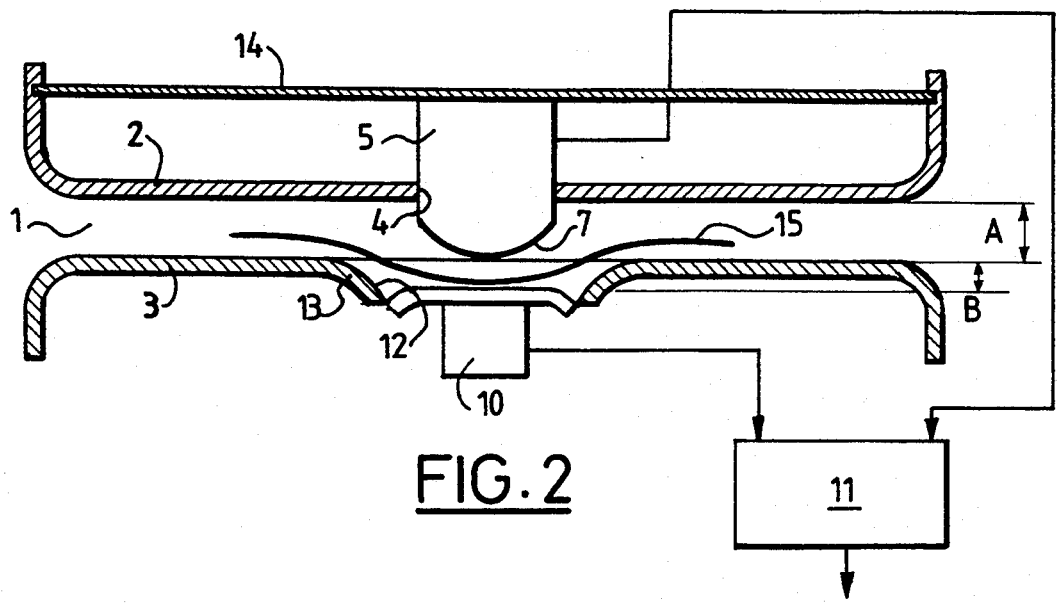
FIG. 2 is a sectional view similar to that of FIG. 1 representing a variant of the magneto-optical reader.

In FIG. 2 is represented a variant of the magneto-optical reader according to the invention.

In this variant, the elements of which corresponding to those of FIG. 1 bear the same reference numerals, the slot 1 is likewise delimited by walls 2 and 3.

In the wall 2 is made an orifice 4 granting passage to a magnetic reading head 5.

In the wall 3 of the slot opposite the wall 2 is on the other hand made an orifice 12 which differs from the orifice 9 made in the wall 3 of the embodiment of FIG. 1, in that it includes rounded edges 13 to allow the positioning of an optical reading head 10 set back slightly with respect to the inside edge of the wall 3.

The magnetic head 5 is linked to the wall 2 of the slot 1 by an elastic leaf 14 which provides for the retracting of the magnetic head 5 on the insertion of a card into the slot 1 and the application of the head against the magnetic tracks of the card.

On the other hand, in the absence of a magnetic card, the elastic leaf 14 returns the magnetic head 5 to a rest position in which its rounded end 7 comes level with the inside edge of the wall 3 of the slot in which the optical reading head 10 is arranged. However, since the optical reading head is mounted set back slightly with respect to the inside edge of the wall 3, a gap of width B is made between the magnetic head 5 and the optical reading head 10 for the passage of an optical code carrier consisting, for example, of a flexible sheet 15.

In fact, the relative position of the magnetic and optical heads 5 and 10 delimits, in this embodiment, a passage for the flexible optical code carrier.

Finally, the variant of FIG. 2 also includes a circuit 11 for recognizing the output signals from the magnetic and optical reading heads.

Figure 3:
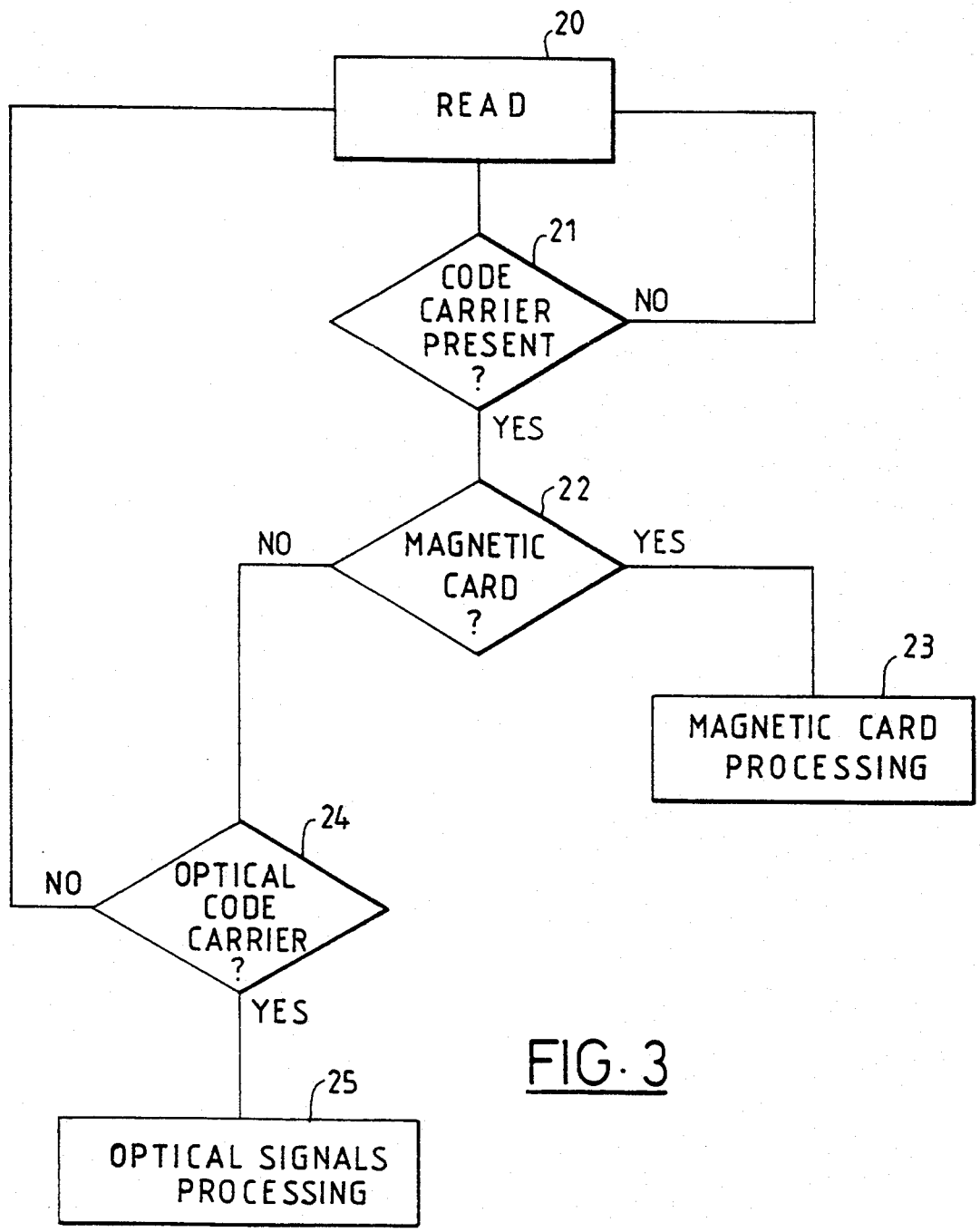
FIG. 3 is a flow chart of a way of determining the kind of signals delivered by the magneto-optical reader according to the invention.

The flow chart of FIG. 3 illustrates a way of recognizing the kind of signals emitted by the magneto-optical reading device according to the invention.

Reading is firstly undertaken with the aid of the optical reader 10, during a phase 20. The next phase 21 consists in determining whether any code carrier is present or not in the slot 1. In the event that this carrier is absent, return to phase 20.

If a carrier is detected in the slot, during phase 22 it is determined whether this is a magnetic card.

If the answer is yes, a processing of the magnetic signals is triggered during phase 23.

If the answer is no, it is determined during phase 24 whether the carrier present in the slot 10 is an optical code carrier.

If the answer is no, return to phase 20.

If the answer is yes, the processing of the optical signals is undertaken during phase 25.

Of course, the designating of the kind of signals emitted by the magneto-optical reading device and the processing of these signals are carried out in the circuit 11 associated with the said head.

A device for reading magnetic codes and optical codes, of the type described above, may have the most diverse applications which are not, of course, limited to gaming terminals.

We claim:

1. Device for reading magnetic codes borne by carriers such as cards of a specified thickness and optical codes printed on carriers of smaller thickness, characterized in that it includes, mounted in opposite walls (2,3) of a common slot with a width slightly greater than the thickness of a magnetic card, a magnetic reading head (5) associated with elastic means (6;14) for applying the magnetic head (5) against the magnetic tracks of the card, and an optical reading head (10), means (11;14) for limiting, in the absence of a magnetic card, the engagement of the magnetic reading head into the slot (1) over a part of the width of the latter so as to leave between the magnetic head and the wall of the slot opposite the latter, a gap (B) sufficient for the passage of a carrier of optical codes, and means (11) for recognizing the output signals from the magnetic reading head (5) or from the optical reading head (10).

2. Device according to claim 1, characterized in that the elastic means consist of a spring (6) for pushing the magnetic reading head (5) towards the inside of the slot (1) and the means for limiting the engagement of the magnetic reading head into the slot (1) consist of an abutment (8) borne by the magnetic reading head (5) and cooperating with a wall (2) of the slot (1) in which the magnetic reading head (5) is movably mounted.

3. Device according to claim 2, characterized in that the optical reading head (10) is mounted in an orifice (9) which is made in the corresponding wall (3) and is flush with the inside edge of the said wall.

4. Device according to claim 2, characterized in that the optical reading head (10) is mounted in an orifice (12) in the corresponding wall (3) of the slot (1) set back slightly with respect to the inside edge of the said wall, the relative position of the magnetic and optical reading heads (5,10) delimiting a chicane for the passage of the optical code carrier.

5. Device according to claim 1, characterized in that the optical reading head (10) is mounted in an orifice (9) which is made in the corresponding wall (3) and is flush with the inside edge of the said wall.

6. Device according to claim 1, characterised in that the optical reading head (10) is mounted in an orifice (12) in the corresponding wall (3) of the slot (1) set back slightly with respect to the inside edge of the said wall, the relative position of the magnetic and optical reading heads (5,10) delimiting a passage for the optical code carrier.

7. Device according to claim 2, characterized in that the elastic means and the means for limiting the engagement of the magnetic reading head (5) into the slot (1) consist of a leaf spring (14) by means of which the magnetic reading head (5) is fixed to the wall (2) of the slot (1), and is mounted movable in an orifice (4) in the said wall.

8. Device according to claim 7, characterized in that the optical reading head (10) is mounted in an orifice (12) in the corresponding wall (3) of the slot (1) set back slightly with respect to the inside edge of the said wall, the relative position of the magnetic and optical reading heads (5,10) delimiting a chicane for the passage of the optical code carrier.

* * * * *